(12) United States Patent
Payne et al.

(10) Patent No.: US 10,077,493 B2
(45) Date of Patent: Sep. 18, 2018

(54) METHODS FOR APPLYING ALUMINUM COATING LAYER TO A CORE OF COPPER WIRE

(71) Applicant: AFL Telecommunications LLC, Duncan, SC (US)

(72) Inventors: David Payne, Moore, SC (US); Joe Cignarale, Greer, SC (US); Dan Nettles, Greenville, SC (US); Apollo Arce, Moore, SC (US); Scotty Osment, Woodruff, SC (US)

(73) Assignee: AFL Telecommunications LLC, Duncan, SC (US)

( * ) Notice: Subject to any disclaimer, the term of this patent is extended or adjusted under 35 U.S.C. 154(b) by 43 days.

(21) Appl. No.: 15/424,414

(22) Filed: Feb. 3, 2017

(65) Prior Publication Data

US 2017/0145555 A1    May 25, 2017

Related U.S. Application Data

(62) Division of application No. 14/443,157, filed as application No. PCT/US2013/070097 on Nov. 14, 2013, now Pat. No. 9,597,747.

(Continued)

(51) Int. Cl.
*B23K 20/00* (2006.01)
*C23C 4/18* (2006.01)
(Continued)

(52) U.S. Cl.
CPC ............ *C23C 4/18* (2013.01); *B22F 5/12* (2013.01); *B22F 7/08* (2013.01); *B23K 20/001* (2013.01);
(Continued)

(58) Field of Classification Search
CPC .. C23C 4/18; C23C 4/131; C23C 4/02; C23C 24/08; C23C 4/134; C23C 4/08;
(Continued)

(56) References Cited

U.S. PATENT DOCUMENTS 2,086,135 A    7/1937  McIlvane
2,800,344 A    7/1957  Wolcott
(Continued)

FOREIGN PATENT DOCUMENTS

CN    101136531 A  *  3/2008
CN    102103906 A     6/2011
(Continued)

OTHER PUBLICATIONS

International Search Report for AFL Telecommunications LLC for International Patent Application No. PCT/US2013/070097 dated Apr. 14, 2014 (2 pages).

*Primary Examiner* — Kiley Stoner
(74) *Attorney, Agent, or Firm* — Dority & Manning, P.A.

(57) ABSTRACT

Methods of applying aluminum coating layers over copper wires are disclosed. A first method may include applying aluminum powder to the surface of a rod, passing the rod through a first set of compression rolls thereby forcing the aluminum powder into a compacted preform around the rod, and heating the rod covered by the preform at 550° C. to 620° C. Further, the heated preform coated rod is passed through a second set of compression rolls thereby obtaining an aluminum coated copper rod. A second method includes disposing a copper rod inside an aluminum tube having an inner layer formed of brazing aluminum alloy, reducing the diameter of the tube's inner surface to match the copper rod, and heating the composite tube-rod such that the inner layer (Continued)

of the brazing alloy fuses to the rod. Another method includes passing the copper rod through a spray of metallic aluminum.

6 Claims, 4 Drawing Sheets

Related U.S. Application Data

(60) Provisional application No. 61/726,603, filed on Nov. 15, 2012.

(51) Int. Cl.

| | | |
|---|---|---|
| *B22F 7/08* | (2006.01) | |
| *B32B 15/01* | (2006.01) | |
| *B32B 15/20* | (2006.01) | |
| *C23C 4/131* | (2016.01) | |
| *C23C 4/134* | (2016.01) | |
| *C23C 24/08* | (2006.01) | |
| *B22F 5/12* | (2006.01) | |
| *C23C 4/02* | (2006.01) | |
| *C23C 4/08* | (2016.01) | |
| *B23K 20/04* | (2006.01) | |
| *B23K 101/32* | (2006.01) | |

(52) U.S. Cl.
CPC ............ *B23K 20/04* (2013.01); *B32B 15/017* (2013.01); *B32B 15/20* (2013.01); *C23C 4/02* (2013.01); *C23C 4/08* (2013.01); *C23C 4/131* (2016.01); *C23C 4/134* (2016.01); *C23C 24/08* (2013.01); *B23K 2201/32* (2013.01)

(58) Field of Classification Search
CPC ... B22F 5/12; B22F 7/08; B32B 15/20; B32B 15/017; B23K 20/001; B23K 2201/32; B23K 1/002; B23K 13/01–13/025; B23K 2203/12; B23K 2203/10; B23K 20/04; B23K 20/103
USPC .... 228/126–134, 248.1–248.5, 233.1–235.3, 228/262.5–262.51, 262.6–262.61, 17; 219/605
See application file for complete search history.

(56) References Cited

U.S. PATENT DOCUMENTS

| | | | |
|---|---|---|---|
| 2,947,069 A | 8/1960 | Carlson | |
| 3,096,577 A * | 7/1963 | Carlson | ............... B21C 1/00 228/118 |
| 3,606,672 A * | 9/1971 | Carlson | ............ B23K 20/2333 228/172 |
| 3,776,473 A * | 12/1973 | Casey | ............... B22F 1/0055 241/15 |
| 4,023,557 A | 5/1977 | Thorne | |
| 4,090,873 A * | 5/1978 | Takamura | ................ B22F 7/08 419/42 |
| 4,102,678 A * | 7/1978 | Gothard | ................... B22F 5/12 419/5 |
| 4,270,373 A | 6/1981 | Hirato | |
| 4,578,115 A * | 3/1986 | Harrington | ............ B22F 1/025 427/456 |
| RE32,399 E | 4/1987 | Nagai | |
| 5,223,349 A | 6/1993 | Kudo | |
| 5,249,731 A | 10/1993 | Ziemek | |
| 6,470,564 B1 | 10/2002 | Wada | |
| 9,844,836 B2 * | 12/2017 | Saxton | ................... B23K 35/24 |
| 2007/0221706 A1 | 9/2007 | Calliham | |
| 2008/0179074 A1* | 7/2008 | Elie | ........................ H01B 3/105 174/110 R |
| 2009/0212025 A1 | 8/2009 | Zuo | |
| 2011/0290458 A1* | 12/2011 | Gruenenwald | .... B23K 35/0238 165/157 |
| 2015/0000783 A1 | 1/2015 | Terada | |

FOREIGN PATENT DOCUMENTS

| | | | | |
|---|---|---|---|---|
| DE | 19633615 A1 | 2/1998 | | |
| EP | 0107011 A1 * | 5/1984 | ............ | C25D 13/16 |
| GB | 488446 | 7/1938 | | |
| GB | 792774 | 4/1958 | | |
| GB | 809812 | 4/1959 | | |
| GB | 1159206 | 7/1969 | | |
| GB | 1296394 | 11/1972 | | |
| JP | 51020744 A | 2/1976 | | |
| JP | 354105790 A | 8/1979 | | |
| JP | 02155581 A * | 6/1990 | | |
| JP | 2003001302 A * | 1/2003 | | |

\* cited by examiner

METHODS FOR APPLYING ALUMINUM COATING LAYER TO A CORE OF COPPER WIRE

CROSS-REFERENCE TO RELATED APPLICATIONS

This application is a Divisional Application of U.S. patent application Ser. No. 14/443,1571, filed May 5, 2015, which is a National Stage Application of PCT/US2013/070097, filed on Nov. 14, 2013, which is based upon and claims the benefit of priority from U.S. Provisional Patent Application No. 61/726603, filed Nov. 15, 2012, the disclosures of all of which are incorporated by reference herein in their entireties.

BACKGROUND

1. Field

The invention relates to methods and apparatuses for applying metallic coating layers over cores of metallic rods and wires.

2. Related Art and Background

For many practical applications, such as power transmission, it is desirable to produce wires including a core of copper, or copper based alloy, coated by an aluminum cladding layer. There are several conventional methods in use for applying an aluminum cladding to a copper core for various applications.

A first method, described in U.S. Pat. No. 2,947,069, requires the application of an intermediate cladding of another metal such as silver to a copper rod by means of spraying, electroplating or wrapping with foil. The silver clad rod is then inserted into a sleeve or tube of aluminum alloy and the whole is then subjected to a cross section reduction of 30% to 40%. The resultant rod is then annealed to help improve the metallurgical bond between the three metals.

Further, the cross section of the rod is reduced by drawing to the desired wire diameter. Problems with this method include the fact that the initial length of the rod is limited to about 25 feet. This, severely limits the length of the final product available. Moreover, the high cost of the silver component further inhibits the widespread use of this method.

Another method for applying an aluminum cladding to a copper core is described in U.S. Pat. Pub. No. 2007/0221706. In this method, aluminum cladding is applied to a copper wire by applying one or two strips of aluminum to the surface of the copper wire and compressing the strip and wire together at high pressure in a process such as roll-forming. One of the drawbacks for this procedure is that it involves elaborate surface cleaning and preparation which must be carried out on both the copper wire and the aluminum strip prior to the cladding process. This preparation and cleaning procedures involves heat treatment in both oxidizing and reducing atmospheres.

The methods and apparatuses in this application overcome some of the drawbacks and shortcomings of the conventional procedures for forming metallic aluminum coating layers over cores of metallic copper rods and wires.

The above information disclosed in this background section is only for enhancement of understanding of the background of the invention and therefore it may contain information that does not form any part of the prior art.

SUMMARY

Exemplary embodiments of the present invention provide methods of applying aluminum coating layers over a copper core rod or wire.

Additional features of the invention will be set forth in the following description, and in part will be apparent from the description, or may be learned from practice of the invention.

An exemplary embodiment of the present invention discloses a method of applying aluminum coating layers over a copper core rod, the method including applying a controlled amount of aluminum powder to the surface of the rod, passing the rod through a first set of compression rolls thereby forcing the aluminum powder into a compacted preform around the rod, and heating the rod covered by the preform to a temperature between 550° C. and 620° C., Further, the heated preform coated rod is passed through a second set of compression rolls thereby obtaining an aluminum coated copper rod.

Another exemplary embodiment of the present invention discloses a method of applying aluminum coating layers over a copper core rod, the method including disposing a copper rod inside an aluminum tube. The aluminum tube includes an inner layer formed of a brazing aluminum alloy. The method further includes reducing the diameter of the aluminum tube containing the copper rod until the inner diameter of the aluminum tube matches the outer diameter of the copper rod thereby obtaining a composite tube-rod, and heating the composite tube-rod to a first temperature. The above process causes the inner layer of the brazing aluminum alloy to melt and fuse to the copper rod.

Another exemplary embodiment of the present invention discloses a method of applying aluminum coating layers over a copper core rod, the method including passing the copper rod at a predetermined speed through a spray of metallic aluminum.

The foregoing general description and the following detailed description are only exemplary and explanatory and they are intended to provide further explanation of the invention as claimed.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
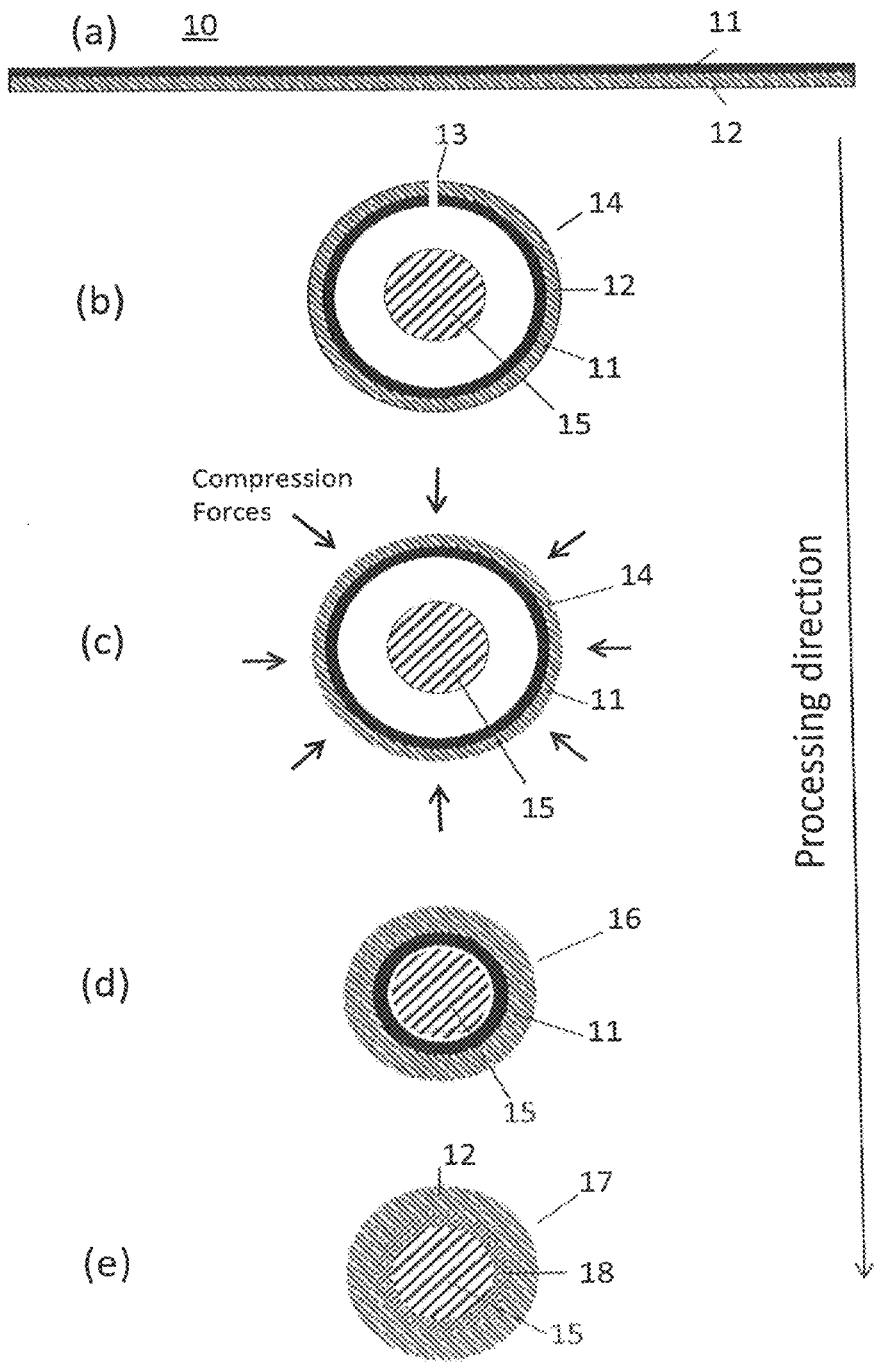
FIG. 1 shows a schematic diagram of a method of applying aluminum coating layers over a copper core rod according to a first exemplary embodiment of the present invention.

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Hereinafter, methods of applying aluminum coating layers over a copper core rod are disclosed. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Throughout the drawings and the detailed description, unless otherwise described, the same drawing reference numerals are understood to refer to the same elements, features, and structures. The relative size and depiction of these elements may be exaggerated for clarity.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order or importance, but rather the terms first, second, etc. are used to distinguish one element from another.

Although some features may be described with respect to individual exemplary embodiments, aspects need not be limited thereto such that features from one or more exemplary embodiments may be combinable with other features from one or more exemplary embodiments.

The aspects of the invention in this application are not limited to the disclosed operations and sequence of operations. For instance, operations may be performed by various elements and components, may be consolidated, may be omitted, and may be altered without departing from the spirit and scope of the present invention.

First Exemplary Embodiment

A method of applying an aluminum coating layer over a copper core rod is described in the following according to a first exemplary embodiment.

In the first exemplary embodiment a copper rod and an aluminum tube are provided. The copper rod may be introduced into the core of the aluminum tube. The inner diameter of the aluminum tube may be significantly larger than the diameter of the rod disposed inside the tube. The inner diameter of the aluminum tube may be between 2 to 3 times larger than the diameter of the copper rod.

An aluminum alloy strip may be used to form the aluminum tube. The aluminum alloy strip used may comprise a composite of an alloy, such as AA3003 or AA1100 or similar. The aluminum alloy strip may comprise on a side a low melting point brazing alloy such as AA4104, AA4047 or similar. The aluminum strip may have a thickness between 0.50 mm to 1.0 mm. The low melting point brazing alloy may be disposed only on one side of the strip. The melting temperature of the brazing alloy may be 1080° F. to 1100° F. The aluminum tube may be formed from the aluminum strip by a process such as roll forming. The aluminum tube is formed such that the low melting point brazing alloy is on the inside of the roll formed tube. The invention is not limited by the size of the aluminum strip or the particular process used to form the aluminum tube. For example, aluminum strips of various may be used and various other procedures may be used to form the aluminum tube. Various combination and dimensions of core alloys and brazing alloys may be used.

After roll-forming the aluminum strip into a tube, the seam of the roll formed tube may be welded. An inert gas, such as Nitrogen, may be introduced into the tube at the point of weld closure to minimize oxygen presence, The composite rod-in-tube (assembly formed by the rod and tube, where the rod is disposed inside the tube) is then reduced in cross section. The reducing in cross section of the composite rod-in-tube may be performed by means such as drawing through conventional drawing dies or passing through further roll forming reduction. The cross section of the composite rod-in-tube is reduced to the point where the outer aluminum tube is tightly compressed onto the inner copper core.

At this point the completed cable length may be subjected to a heating cycle sufficient to induce the brazing alloy layer to melt and produce a metallurgical bond between the copper core and the outer aluminum alloy tube.

A suitable flux coating may be applied to the copper core before the copper core is fed into the aluminum tube. The amount of flux applied may be very small. The flux applied may have minimal or no residue. A flux such as "Nocolok" (N.B Alcan Trade mark name) which has minimal or no residue would be suitable. The invention is not limited by the presence of the flux coating step or by the position of the welding step in the processing sequence. The flux coating step may be performed at various stages during processing or may be omitted altogether.

The resultant composite rod may then be reduced to the final required size by conventional drawing processes or other processes. The aluminum clad copper rod may be formed on a continuous roll forming machine which incorporates a continuous seam weld for sealing the aluminum tube. The invention is not limited to the particular procedure used to perform reducing of the copper rod to the desired dimensions, to the welding procedures, or the procedures used to form the aluminum tube. For example, various other procedures may be used to reduce the size of the aluminum clad copper rod to the desired dimensions, to form the aluminum tube, or to perform welding.

The method of applying an aluminum coating layer over a copper core rod according to the first exemplary embodiment makes possible the economically efficient manufacturing of very long aluminum clad copper wires for which a firm metallurgical bond is produced between the copper rod and the aluminum, cladding layer. The length of the wires is practically limited only by the availability of the desired length of copper rod on reels to be paid off into the roll forming operation and the ability to physically handle the reel size of the completed composite, bearing in mind that this reel must be accommodated in a heating oven at approximately 1100° F. Moreover, according to the first exemplary embodiment it is possible to manufacture good quality aluminum clad copper wires without the need for expensive intermediate metal application. Thus, this method presents clear advantages over the conventional methods, such as the method described in the U.S. Pat. No. 2,947,069, which necessitates the application of an expensive silver intermediate layer between the aluminum and copper and which severely limits the length of the initial wire manufactured. Further, this method presents clear advantages over the conventional method described in the in U.S. Pat. Pub. 2007/0221706 which involves treatment in both oxidizing and reducing atmosphere.

The above process and method of applying an aluminum coating layer over a copper core rod may be carried out in a continuous process on a manufacturing line. Such a process is described hereinafter with reference to FIGS. 1 and 2 and may include the following steps, FIG. 1(a) shows a cross section of an aluminum strip 10 which is provided in a first step of the method (s101 in FIG. 2). The strip may be about 0.050" thick and about 2.43" wide. The aluminum strip may be a clad product with the tore 12 being formed of a first alloy (typically an alloy such as AA3003) and a clad layer 11, formed of a second alloy, disposed on one side of the strip 10. The clad layer 11 may be formed of a lower melting point alloy such as AA4104 to a thickness of 10%+/−1% of the total strip thickness (i.e. 9%-11% of the overall strip thickness).

Figure 2:
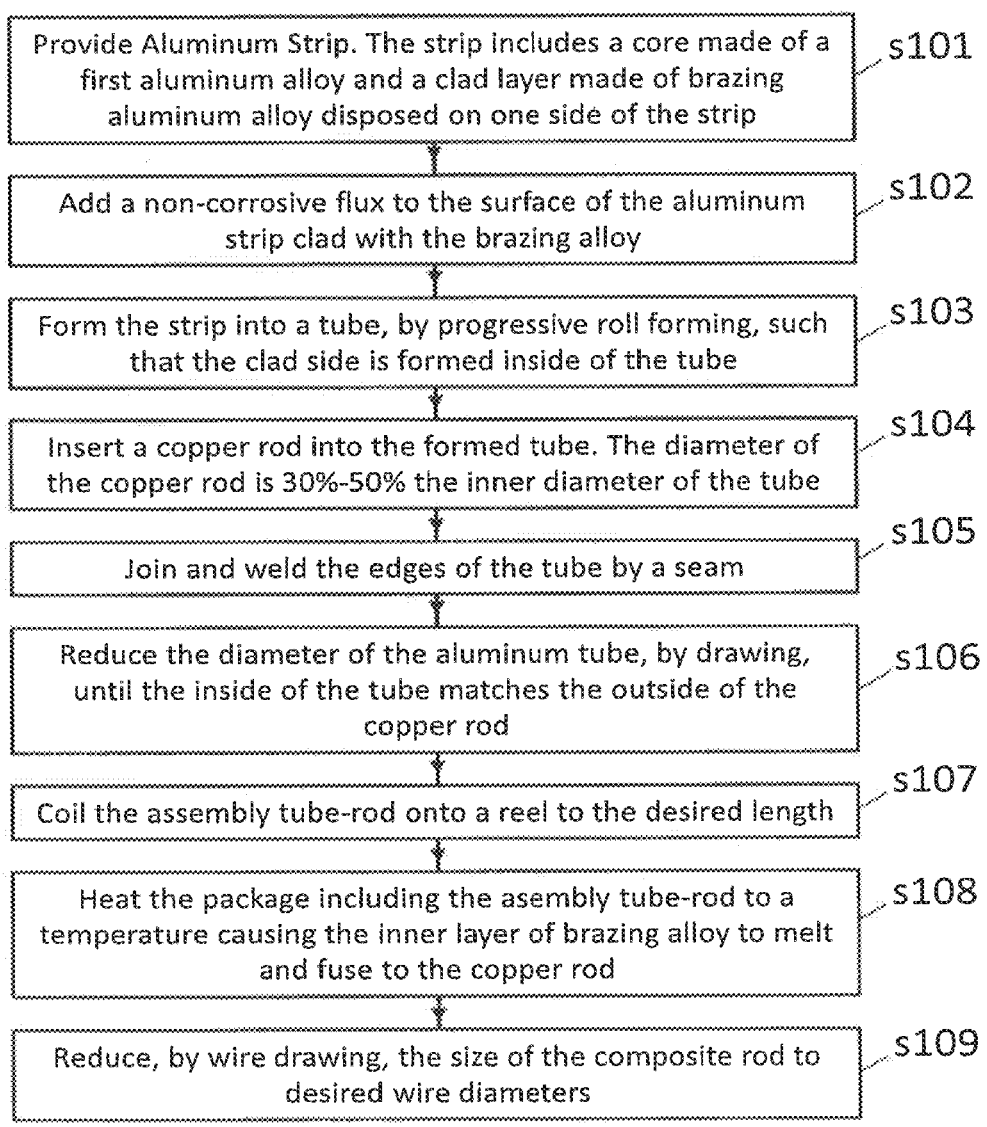
FIG. 2 shows a flow chart of a method of applying aluminum coating layers over a copper core rod according to a first exemplary embodiment of the present invention.

The strip 10 is formed into a tube 14, as shown in FIG. 1(b), by a process such as progressive roll forming (s103 in FIG. 2). The strip 10 is presented to the roll forming mill such that the clad side 11 is formed to be the inside of the tube. The formed tube 14 may have an outer diameter of about 0.80".

A copper rod 15 is introduced into the formed tube 14 by being paid off from a reel under controlled tension at a point where the opening between the edges of the semi-formed tube is wide enough to accept the copper rod (s104 in FIG. 2). The copper rod 15 may have a diameter of about 0.3".

The edges of the roil formed tube are then brought together at the end of the roll forming process and the joint 13 is welded by means of a continuous tungsten inert gas (TIG) welding process (s105 in FIG. 2). The TIG weld is configured to give minimal weld projection into the inside of the formed tube 14.

In the same continuous process, the aluminum tube 14 containing the copper rod. 15 may be conveyed through a series of drawing dies. The drawing dies are compressing the tube around the rod, as shown in FIG. 1(c), and are reducing the outer diameter of the aluminum tube 14, as shown in FIG. 1(d), until the inner diameter of the aluminum tube 14 matches the outer diameter of the copper rod 15 (s106 in FIG. 2). The copper rod 15 is then firmly disposed inside the aluminum tube 14 for the entire continuous length of the manufactured product as shown in FIG. 1(d). Alternatively, the desired reduction in tube diameter can be achieved by utilizing a series of forming rolls to progressively reduce the tube diameter until the inner diameter of the tube is equal to the diameter of the copper rod inside. The obtained composite copper rod-aluminum tube 16, as shown in FIG. 1(d), may then be coiled onto a steel reel until the desired length is reached (s107 in FIG. 2).

The composite copper rod-aluminum tube 16, as shown in FIG. 1(d), may then be heated in inert atmosphere, such as Nitrogen, in a suitable oven to a temperature suitable to cause the inner layer of the brazing alloy 11 to melt and fuse to the copper rod 15 (s108 in FIG. 2). The temperature may be about 1100° F. The brazing alloy 11 may be a AA4104 alloy. The composite copper rod-aluminum tube is held at the suitable temperature for sufficient time for the aluminum alloy to fuse to the copper rod and to form a good metallurgical bond, as shown by 18 in FIG. 1(e), between the copper rod 15 and aluminum clad 14, thereby obtaining an aluminum clad copper rod 17 as shown in FIG. 1(e).

The aluminum clad copper rod 17 may then be drawn down to required wire diameters by conventional wire drawing processes (s109 in FIG. 2).

Additional steps may be added to the above manufacturing process. For instance, a non-corrosive flux may be added to the surface of the aluminum strip which is clad with the brazing alloy (s102 in FIG. 2). The addition of the flux may allow the use of alternative brazing alloys, other than the AA4104 alloy, such as AA4043 and AA4045 alloys.

Second Exemplary Embodiment

A method of applying an aluminum coating layer over a copper core rod is described in the following according to a second exemplary embodiment.

In a first step a copper rod is provided. The copper rod may be in a hard drawn state or a fully annealed state. The copper rod may be paid off from a payoff with controlled back tension. The copper rod may be then passed through a straightening station to provide a straight, smooth running product for the remaining process.

In another step, the copper rod may be passed through a surface cleaning process such as grit-blasting. The rod may be cleaned by the application of steel grit blast granules from high pressure nozzles. The amount of blast grit and the pressure of blast grit may be adjusted such as to avoid abrasion of the copper rod.

After the cleaning process, a finely divided aluminum powder may be applied to the surface of the copper rod. The aluminum powder should be of high purity (>99% Aluminum). The aluminum powder may have a gain size between 100 microns and 600 microns Preferably should have a grain size between 150 microns and 200 microns. The melting point for such a powder may be 665° F.+/−5° F. The application of the aluminum powder may be performed by passing the rod through the axis of a screw feeder which applies a controlled amount of finely divided aluminum powder to the surface of the rod. On a production line the application of the aluminum powder may take place immediately before the "nip" point of a set of four compression rolls. The compression rolls may be contoured to match the rod diameter and may be positioned at 90 degrees to each other around the circumference of the rod, The aluminum powder may be further compacted on the rod's surface. The compacting may be performed by high pressure rolls or in other ways. The compression rolls may force the aluminum powder into a dense, compacted preform around the rod, completely covering the rod surface with a controlled depth of compressed powder. The depth of the compressed powder may be, typically, between 0.50 to 0.75 mm.

The "green rod" (i.e. the rod and covering preform) may be rapidly heated to a high temperature in the range 500° C. to 640° C. preferably in the range 580° C. to 620° C. The heating may be performed by an induction coil or other means. For example, the rod and covering preform may be passed through an induction heater which heats the surface of the preform coated rod to a temperature between 500° C. and 620° C. at a rate of between 50 and 100° C. per second. The heating has the effect that a metallurgical bond is formed between the aluminum clad and the copper rod. The invention is not limited to the particular procedure or apparatus used to heat the coil, to the particular dimensions of the rod and preform, or to the particular apparatus used to create the aluminum powder preform. For example, various other procedures may be used to heat the preform coated rod and to create the powder preform.

The aluminum clad rod may be further compacted by high pressure rolls and/or dies thereby enhancing the bond between the aluminum and copper. For instance, upon exiting the induction heating section, the heated preform coated rod may be passed through a second set of four compression rolls. The second set of rolls are contoured to fit the rod diameter and may be set at 90 degrees to each other. The second set of compression rolls may be offset by 45 degrees from the first set of compression rolls. Thereby pressure is applied over the entire circumference of the rod during the pass through the two sets of compression rolls. Tension in the rod may be maintained by passing the rod over a capstan. The invention is not limited by the particular procedure or apparatus used to compact the aluminum clad copper rod. Various other procedures for compacting the aluminum clad copper rod may be used.

The resulting clad rod may be reduced in diameter to a desired size by conventional wire drawing processes. For instance, the resulting clad rod may be cooled and drawn to a desired size by means of drawing through dies.

Annealing may be performed such as to facilitate reducing the size of the wires at any necessary point in the wire drawing process. The above method of cladding aluminum on copper wire makes possible the efficient manufacturing of very long aluminum clad copper wires. The above method has a further advantage that there is no "off line" heat treatment processes involved.

The above process and method of applying an aluminum coating layer over a copper core rod may be carried out on a continuous powder cladding and sintering line and may include, as described with reference to FIG. 3, the following steps.

In a first step, a copper rod may be paid off from a payoff with controlled back tension (s201). The rod may be further passed through a straightening station to provide a straight, smooth running product for the remaining process (s201 in FIG. 3). The rod may then be cleaned by the application of steel grit blast granules from high pressure nozzles (s202 in FIG. 3). The amount of blast grit and the pressure of the blast grit may be adjusted such as to avoid abrasion of the copper rod.

Figure 3:
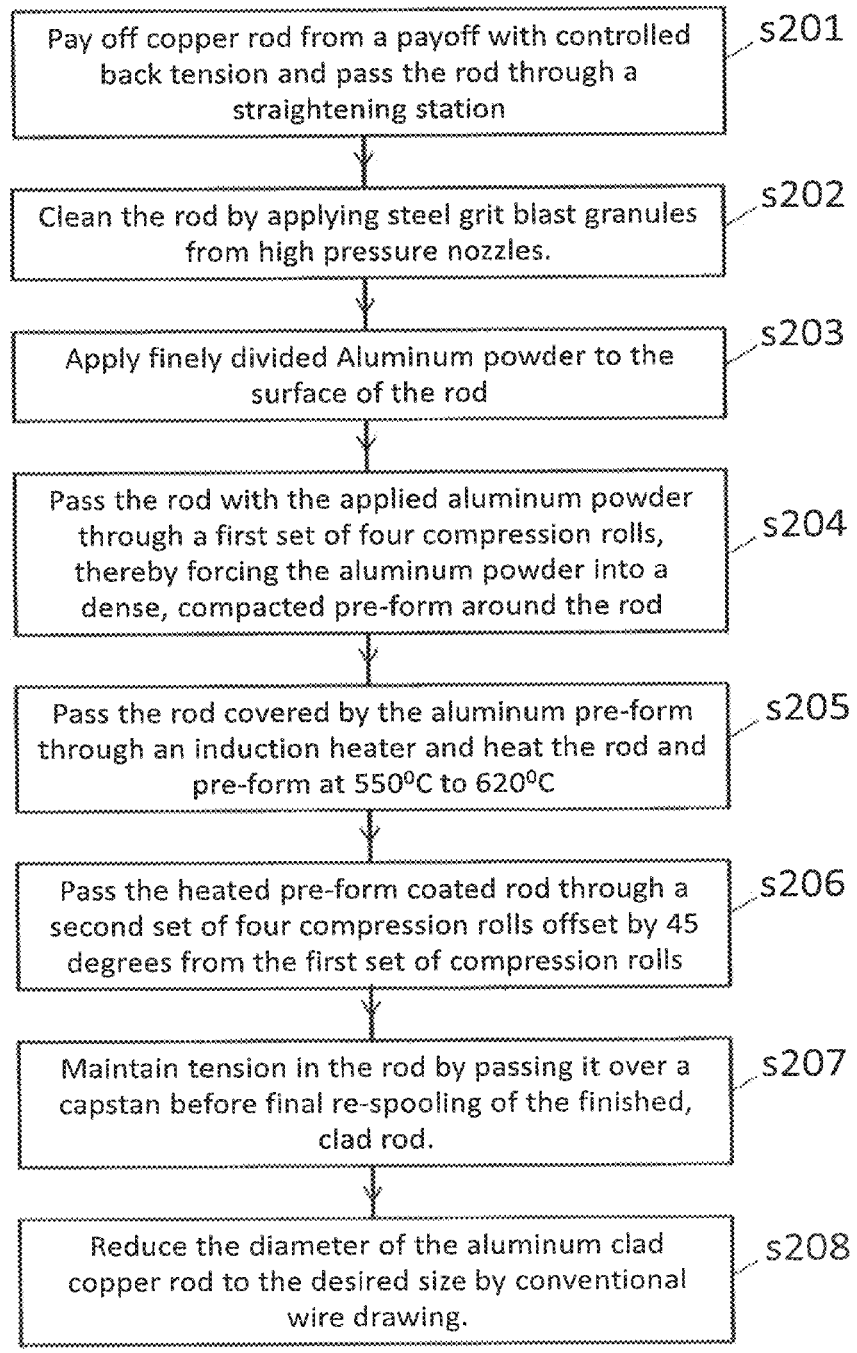
FIG. 3 shows a flow chart of a method of applying aluminum coating layers over a copper core rod according to a second exemplary embodiment of the present invention.

The rod may then be passed through the axis of a screw feeder which applies a controlled amount of finely divided aluminum powder to the surface of the rod (s203 in FIG. 3). The application of the aluminum powder takes place immediately before the "nip" point of a first set of four compression rolls. The compression rolls in the first set are contoured to match the rod diameter and are positioned at 90 degrees to each other around the circumference of the rod. These compression rolls force the aluminum powder into a dense, compacted preform around the rod, completely covering the rod surface with a controlled depth of compressed powder (s204 in FIG. 3).

The rod and covering preform may then be passed through an induction heater which heats the surface of the preform coated rod to a temperature between 550° C. and 620° C. (s205 in FIG. 3). Upon exiting the induction heating section, the heated preform coated rod is passed through a second set of four compression rolls (s206 in FIG. 3). Like the first set of compression rolls, the second set of compression rolls are contoured to fit the rod diameter and are set at 90 degrees to each other. The second set of compression rolls are offset by 45 degrees from the first set of compression rolls thereby pressure is applied over the entire circumference during the pass through the two sets of compression rolls. The invention is not limited by the particular arrangement of the compression rolls. Various arrangements of the compression rolls may be employed.

Tension is maintained by passing the rod over a capstan before final re-spooling of the finished, clad rod (s207 in FIG. 3). The clad rod may then be reduced in diameter to the required size by conventional wire drawing processes (s209 in FIG. 3).

Third Exemplary Embodiment

A method of applying an aluminum coating layer over a copper core rod is described in the following, with reference to FIG. 4, according to a third exemplary embodiment.

The method includes depositing of a coating of aluminum alloy onto a moving copper rod. The depositing may include a thermal metal spray deposition process. The depositing of the aluminum alloy onto the moving copper rod may be performed in a continuous manner. One or more spray guns may be used to perform the deposition process.

The thermal spray deposition process may include generating an arc or a plasma which may cause the rapid melting and atomization of a suitable aluminum alloy feed wire. Subsequently, this atomized spray of molten aluminum is directed towards the copper rod and deposited onto the copper rod core. Thereby a layer of aluminum is formed on the surface of the copper rod. This layer can be adjusted to the desired thickness by means of the adjustments to the processes described in the following two paragraphs and is typically be in the range of 1% to 10% of the copper rod diameter.

The amount of aluminum deposited on the copper core may depend on the design of the spray guns, functional parameters of the spray guns, number of the spray guns and position of the spray guns with respect to the copper core. The amount of aluminum deposited on the copper core may further depend on the speed of the copper core with respect to the spray guns.

Accordingly, the design of the spray guns, the functional parameters of the spray guns, the number of the spray guns, the position of the spray guns with respect to the copper core, and the speed of the copper core with respect to the spray guns may be adjusted such as to obtain a deposited aluminum clad layer having the desired parameters. The parameters of the aluminum clad layer deposited on the copper core may be adjusted such as to obtain the design requirement of the aluminum clad copper wire product. The parameters of the aluminum clad copper rod that may be adjusted by the aforementioned process (i.e. adjusting characteristics of the spray guns and the speed of the copper rod) may include a thickness of the aluminum clad layer, an amount of aluminum deposited per unit length of copper core, a metallic bond strength between the aluminum clad layer and the copper core and others.

After aluminum clad layer is deposited on the copper rod, a conventional drawing process may be performed on the aluminum clad copper rod such as to reduce its cross section to the desired or required dimensions.

The method of cladding an aluminum layer on copper wire, according to the third exemplary embodiment, makes possible the economical and efficient manufacturing of very long aluminum clad copper wires. The above method has a further advantage that the need for expensive pre-cleaning and surface preparation is eliminated or minimized.

The above process and method of applying an aluminum coating layer over a copper core rod, according to the third exemplary embodiment of the invention, may be carried out in a continuous process on a manufacturing line and, as described with reference to FIG. 4, may include the following steps.

A copper rod having a diameter of approximately 0.30" is provided. The copper rod may be cleaned and subjected to surface grit blasting in order to ensure that the surface of the rod is both clean and receptive to the application of atomized aluminum spray (s301 in FIG. 4).

A system of spray applicators for spraying atomized aluminum is provided. The atomized aluminum is produced by the atomization of aluminum wire in a plasma spray applicator, an arc spray applicator or a similar metal spray applicator.

Figure 4:
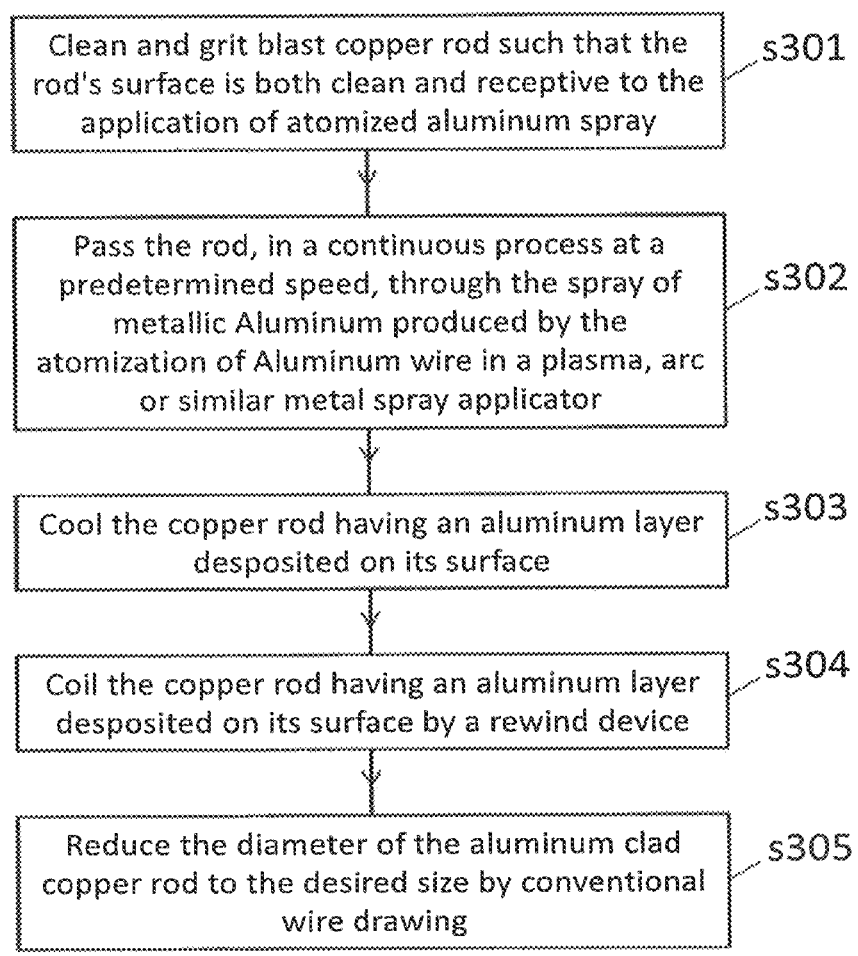
FIG. 4 shows a flow chart of a method of applying aluminum coating layers over a copper core rod according to a third exemplary embodiment of the present invention.

The aluminum cladding is applied on the copper rod by passing the copper rod in a continuous process at a predetermined speed through the spray of metallic aluminum produced by the system of spray applicators (s302 in FIG. 4).

The system of spray applicators may include several spray applicators that may be arranged in series such that all the surface area of the copper rod is subject to spraying during its passage through the spray zone.

The number of the spray applicators, the deposition rate corresponding to each applicator and the arrangement of the spray applicators may be matched to the speed of the rod passing through the spray "zone" in order to achieve the desired deposit thickness of aluminum onto the copper rod.

The obtained aluminum clad copper rod is cooled to the desired temperature (s303 in FIG. 4). Then the aluminum clad copper rod is coiled by means of a suitable rewind device (s304 in FIG. 4). Further, the aluminum clad copper rod is reduced to the desired or required diameter by conventional wire drawing processes (s305 in FIG. 4).

The methods disclosed in this application have important advantages over the state of the art and conventional methods of manufacturing copper wires coated by an aluminum coating layer.

For example, by employing the methods described in this application it is possible. to efficiently manufacture a final product of aluminum clad copper wire having very long lengths The length of the wires is practically limited only by the capacity of the payoff reels for the copper rod and the take up reels for the finished composite product. For which a firm metallurgical bond is produced between the copper rod and the aluminum cladding layer. The manufacturing processes involved in the methods according to the first and third exemplary embodiments may be performed in a continuous way and in one location. The manufacturing processes and steps involved in the method according to the second exemplary embodiment may be performed in a continuous way and in one location with the exception of the brazing step/process which may involve a separate furnace operation.

Moreover, the methods disclosed in this application do not involve the use of expensive intermediate materials such as silver. Thus, these methods present clear advantages over the method described in the U.S. Pat. No. 2,947,069 which necessitates the application of an expensive silver intermediate layer between the aluminum and copper and which severely limits the length of the initial wire length manufactured.

Further, the heating cycles used are simpler than in other conventional methods, such as the ones described in the in U.S. Pat. Pub. 2007/0221706, which involve furnace cycles taking place in both oxidizing and reducing atmosphere. The methods disclosed in this application employ at most a single conventional heating cycle.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A method of applying aluminum coating layers over a copper core rod, the method comprising:
    applying a controlled amount of aluminum powder to the surface of the rod;
    passing the rod through a first set of compression rolls thereby forcing the aluminum powder into a compacted preform around the rod;
    heating the rod covered by the preform to a temperature between 550° C. and 620° C.; and passing the heated preform coated rod through a second set of compression rolls thereby obtaining an aluminum coated copper rod.

2. The method of claim 1, further comprising:
    reducing the diameter of the aluminum coated copper rod to a desired size by a wire drawing process.

3. The method of claim 1, wherein:
    the first set of compression rolls comprise four compression rolls each contoured to match the rod diameter and positioned at 90 degrees to each other around the circumference of the rod;
    the second set of compression rolls comprise four compression rolls each contoured to match the rod diameter and positioned at 90 degrees to each other around the circumference of the rod; and
    the second set of compression rolls are offset by an angle of about 45 degrees from the first set of compression roles.

4. The method of claim 1, further comprising the steps:
    prior to applying the aluminum powder to the surface of the rod, cleaning the copper core rod by applying steel grit blast granules.

5. The method of claim 4, wherein the applying of steel grit blast granules is performed such that the copper rod is not abraded by the grit blast granules.

6. The method of claim 1, wherein the heating is performed by passing the rod covered by the preform through an induction heater.

* * * * *